Dec. 19, 1967         J. C. DAWSON         3,358,888
DISPENSING APPARATUS
Filed Jan. 5, 1966                                    2 Sheets-Sheet 1

INVENTOR
JOSEPH CARL DAWSON
BY
ATTORNEY

Dec. 19, 1967    J. C. DAWSON    3,358,888
DISPENSING APPARATUS
Filed Jan. 5, 1966    2 Sheets-Sheet 2
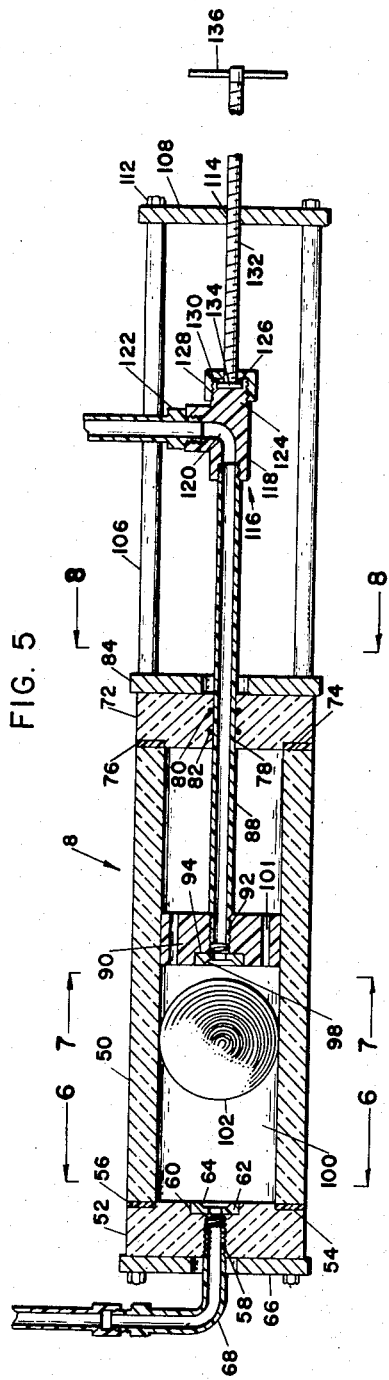
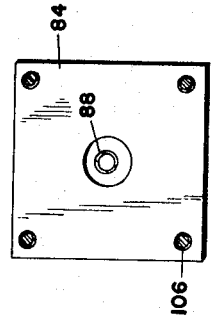
FIG. 8
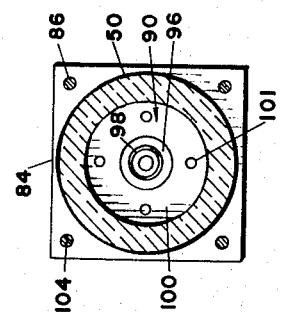
FIG. 7
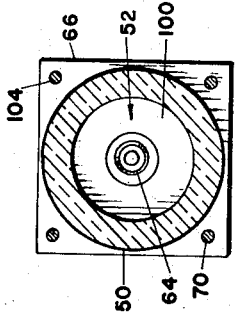
FIG. 6
INVENTOR
JOSEPH CARL DAWSON
BY
ATTORNEY

United States Patent Office 3,358,888
Patented Dec. 19, 1967

3,358,888
DISPENSING APPARATUS
Joseph Carl Dawson, St. Louis County, Mo.
(93 Ford Lane, Hazelwood, Mo. 63042)
Filed Jan. 5, 1966, Ser. No. 518,899
10 Claims. (Cl. 222—250)

ABSTRACT OF THE DISCLOSURE

A device for dispensing measured quantities of liquid and including a tubular measuring chamber having a rigid wall at one end and a shiftable wall at the other end so that the volume of the chamber can be changed. The walls are centrally provided with ports and freely fitted within the chamber between the walls is a measuring element having a specific gravity equal to that of the fluid being measured. Two opposed ports of a four-way valve are connected to the ports in the walls, while the other two ports of the valve are connected to a pressurized reservoir of fluid and a discharge conduit. The shiftable wall is moved axially within the chamber by means of a threaded shaft.

---

This invention relates in general to a dispensing apparatus and, more particularly, to a device for dispensing measured amounts of liquids.

In the chemical and related industries it is often necessary to mix various fluids together to create a desired end product. Such mixing can take place in a container into which correctly measured amounts of two different liquids are passed or it can be accomplished by injecting measured amounts of one liquid at periodic intervals into another liquid flowing within a tubular conduit. Heretofore, devices for accomplishing this end have been complicated and many of such devices do not deliver accurate dosages. Moreover, such devices often react slowly and therefore, have a very limited capacity.

The present invention resides in a measuring unit and associated components, the measuring unit having a movable element fitted therein. Fluid under pressure is forced into one end of the unit causing the movable element to move therein and force a measured quantity of fluid out of the opposite end. Thereafter, pressure is applied to the opposite end of the unit which will cause the element to move in the reverse direction and force another measured charge out of the unit.

Among the several objects of the present invention may be noted the provision of a dispensing device which dispenses accurately measured dosages of fluids; the provision of a measuring device of the type stated which dispenses dosages at closely spaced intervals of time; the provision of a measuring device of the type stated which is simple and rugged in construction and economical to manufacture; and the provision of a measuring device of the type stated which is ideally suited for injecting measured quantities of liquids into other liquids flowing within a tubular conduit. Other objects and features will be in part apparent and in part pointed out hereinafter.

The invention accordingly comprises the constructions hereinafter described, the scope of the invention being indicated in the following claims.

In the accompanying drawings, in which one of various possible embodiments of the invention is illustrated, FIG. 1 is a side elevational view of a dispensing apparatus constructed in accordance with and embodying the present invention;

FIG. 5 is a sectional view taken along line 5—5 of FIG. 2; and

Figure 1:
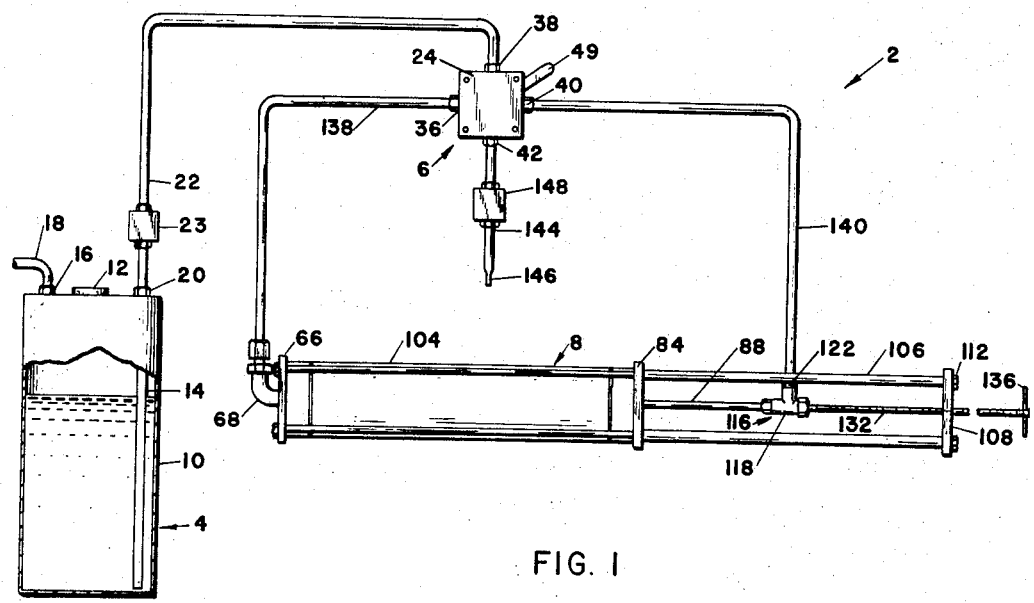
Figure 2:
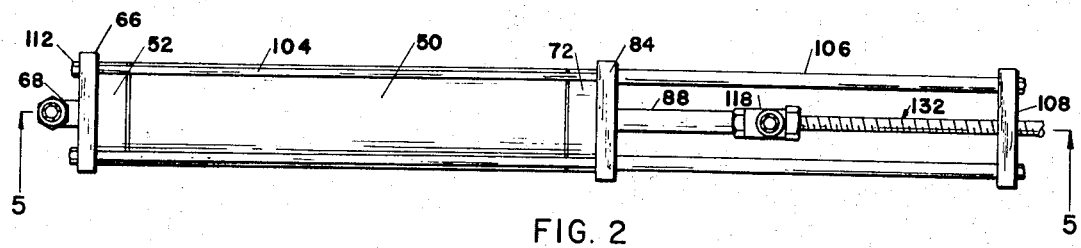
FIG. 2 is a top plan view of a measuring unit forming part of the present invention.

FIGS. 6, 7, and 8 are sectional views taken along lines 6—6, 7—7, and 8—8, respectively, of FIG. 5.

Corresponding reference characters indicate corresponding parts throughout the several views of the drawings.

Referring now in more detail and by reference characters to the drawings, which illustrate a preferred embodiment of the present invention, 2 designates a dispensing apparatus including a liquid reservoir 4, a control valve 6, and a measuring unit 8 which are connected as schematically illustrated in FIG. 1.

The reservoir 4 comprises a tank 10 having a sealed top cap 12 capable of withstanding substantial outwardly directed forces caused by internal pressures, top cap 12 being further adapted for optional removal. Extending through the top wall of tank 10 and being welded, brazed, or otherwise securely sealed therein is a discharge tube 14 which terminates at one end in close proximity to bottom wall of tank 10. Also fitted within the top wall of tank 10 in sealingwise engagement therewith and located in close proximity to top cap 12 is an inlet fitting 16 which communicates with the interior of tank 10. Conventionally connected to inlet fitting 16 in any suitable manner is a pneumatic line 18 which is connected to a source of pressurized air (not shown) and is adapted for introducing pressurized air into the interior of tank 10, which air maintains the liquid therein under pressure. In this connection, it should be noted that the air pressure within tank 10 should remain substantially constant, for purposes presently more fully appearing. Connected to discharge tube 14 at its outwardly presented end by a conventional flare, sweat or any other suitable fitting 20 is a discharge line 22 which interconnects reservoir 4 and control valve 6. Interposed in the discharge line 22 is a filter 23.

Figures 3, 4:
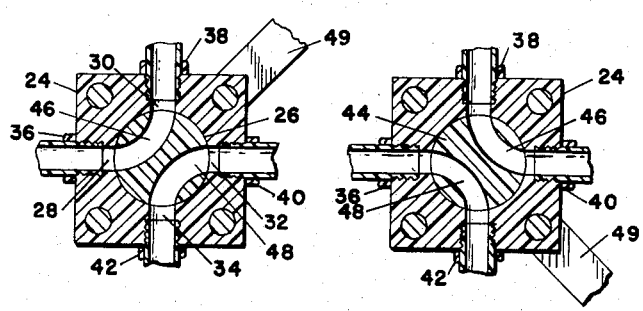
FIGS. 3 and 4 are sectional views of a control valve forming part of the present invention.

Control valve 6 is conventional in design and manufacture and it is, therefore, sufficient for purposes of the present disclosure to indicate that it includes a valve body 24 internally provided with a cylindrical chamber 26 having four circumferentially spaced ports 28, 30, 32, 34, extending radially therefrom and located 90° apart. Threaded into ports 28, 30, 32, 34, are four flare, sweat, or other conventional type fittings 36, 38, 40, 42, respectively, fitting 38 being connected to discharge line 22 while the remaining fittings are connected in a manner presently to be described. Snugly, but rotatably fitted within chamber 26 is a cylindrical valve member 44 having two arcuate channels 46, 48, which terminate at circumferentially spaced ports located 90° apart. At its one end cylindrical valve member 44 projects beyond valve body 24 where it is securely fastened to a control handle 49 for rotating valve member 44 between first and second positions spaced 90° apart. As will be seen by reference to FIG. 3, when in the first position, ports 28, 30, and 32, 34, are in communication through arcuate channels 46, 48, respectively. When valve member 44 is rotated to the second position, reference being made to FIG. 4, it is apparent that ports 30, 32, and 28, 34, come into communication by virtue of the alternate positioning of channels 46, 48, respectively. Thus, two alternate flow paths are established through control valve 6. In this connection, it should be pointed out that several types of control valves suitable for use in the present invention are currently available on the market, and this invention is not necessarily limited to the one heretofore described.

Referring now to FIG. 5, measuring unit 8 includes a tubular body 50 which is preferably of cylindrical configuration and is machined or otherwise formed from a suitable synthetic resin or metal, the choice of the material being dependent on the particular liquid unit 8 is designed to meter. In other words, the material from which tubular body 50 is formed should remain chemically stable or inert in the presence of the liquid metered by unit 8. At its one end, tubular body 50 is fitted with a cylindrical end cap 52, the inwardly presented face of which is turned down in the provision of an annular recess 54 which accepts an elastomeric seal 56, seal 56 being interposed between end cap 52 and the annular end of tubular body 50 so as to provide a fluid-tight seal therebetween. End cap 52 is centrally provided with an axially extending threaded port 58 which inwardly terminates at a cylindrical recess 60 into which is adhesively or otherwise securely fitted an elastomeric annular seal 62 having an inwardly beveled sealing surface 64, all for purposes presently more fully appearing. Disposed in facewise abutment with the the outwardly presented face of end cap 52 is a rectangular end plate 66 which is centrally apertured for accommodating the threaded male end of a street L or other suitable fitting 68 which is, in turn, threadedly fitted into port 58 of cap 52. The corners of rectangular end plate 66 project beyond the cylindrical surfaces of cap 52 and body 50 where they are provided with apertures 70 for purposes presently more fully appearing.

Suitably fitted over the opposite end of tubular body 50 is an end cap 72 having an annular recess 74 which accepts an elastomeric seal 76 for sealing the opposite annular end of tubular body 50. End cap 72 is centrally provided with an axially extending bore 78 having axially spaced annular grooves 80 into which are fitted O-rings 82. Similarly disposed against the outwardly presented face of end cap 72 is a rectangular intermediate plate 84 which is provided at its corners with apertures 86, plate 84 being identical to end plate 66.

Slidably fitted within bore 78 is a tubular rod 88 which is threaded at both ends but is otherwise provided with a smooth cylindrical external surface which is snugly embraced by O-rings 82 to prevent escape of fluid from the interior chamber defined by tubular body 50. Rod 88 carries a cylindrical piston 90 having a centrally disposed axially extending threaded port 92 which inwardly terminates at a cylindrical recess 94 into which is adhesively or otherwise securely fitted an annular elastomeric seal 96 having an inwardly beveled sealing surface 98. At its opposite end, port 92 accepts the threads of rod 88 whereby rod 88 and piston 90 are rigidly fastened one to the other. Thus, the inwardly presented cylindrical surface of tubular body 50 and the opposed faces of end cap 52 and piston 90 define a cylindrical measuring chamber 100. Moreover, it should be noted that piston 90 is provided with a plurality of axially extending holes 101 for providing communication between the cylindrical chambers located on each side thereof. Freely carried in measuring chamber 100 for movement to-and-fro therein is a spherical metering element 102 which is adapted to move with the momentum of the fluid passing through measuring unit 8 as will presently be described in greater detail. In this connection, it has been found, by actual experiment, that a metering element 102 which is formed from a material having a specific gravity substantially equal to the specific gravity of the particular liquid being measured is best suited for purposes of the present invention, but metering elements having specific gravities considerably different from the metered fluid have served quite satisfactorily and this invention is not necessarily limited to the former type of metering element 102.

Fitted through axially aligned apertures 70, 86, of end plate 66, 84, are tie rods 104 which project substantially beyond intermediate plate 84 where they are provided with spacer sleeves 106. Beyond spacer sleeves 106, tie rods 104 carry an end plate 108 having apertured corners similar to plates 66, 84, for accepting the ends of tie rods 104. Threaded over the ends of tie rods 104 are nuts 112 which force sleeves 106 against intermediate plate 84 and end caps 52, 72, in turn, tightly against the annular ends of tubular body 50. It should be noted that end plate 108 is very similar to plates 66, 84, but nevertheless differs slightly therefrom for it is centrally provided with a threaded aperture 114 for purposes presently more fully appearing.

Threaded over the outwardly presented end of rod 88 and rigidly carried thereby is a swivel fitting 116 having an elbow-forming body 118 which is internally provided with a channel 120 which, in turn, communicates at one end with the interior of rod 88 and is fitted at its other end with a conventional flare, sweat, or other suitable connection fitting 122. Projecting axially with respect to rod 88 and rearwardly from the heel of elbow-forming body 118 is an externally threaded cylindrical boss 124 which is internally relieved from its end face in the provision of a cylindrical recess 126. Threaded over boss 124 is a nut 128, one end of which merges into an inwardly projecting annular lip 130 which extends partially over recess 126 in encircling relation to the walls thereof. End plate 108 carries a lead screw 132, the threads of which engage the threads of aperture 114. At its one end, lead screw 132 integrally includes a radially projecting flange 134 which fits snugly but rotatably within recess 126, as best seen in FIG. 5. Annular lip 130 extends over and engages the shoulder formed by flange 134 so as to preclude its removal from recess 126. At its other end, lead screw 132 is provided with a handle 136 for conveniently rotating the same and thereby causing swivel fitting 116 to move to-and-fro with respect to end plate 84.

Interposed between and conventionally connected to fitting 36 of valve 6 and street L 68 carried by end cap 52 is a hose or other suitable conduit 138, and interconnecting fitting 40 of valve 6 and connection fitting 122 of swivel fitting 116 is a flexible hose 140. It has already been noted that discharge line 22 extends between fitting 38 on valve 6 and fitting 20 carried by tank 10. Finally fitting 42 on valve 6 is connected to a hose or other suitable conduit 144 which leads to the point where the liquid from reservoir 4 is dispensed, delivered, mixed, or otherwise put to use, so to speak.

At its terminal or free end conduit 144 is provided with a somewhat reduced restriction or orifice 146 which is smaller in cross-sectional area than the cross-sectional area of the smallest restriction located in the various conduits, hoses, ports and the like preceding it. Located in the conduit 144 intermediate valve 6 and orifice 146 is a resistance valve 148 which permits passage of fluid through conduit 144 only after the liquid preceding it in conduit 144 has reached a preselected pressure. The pressure required to open resistance valve 148 is minimal inasmuch as resistance valve 148 is provided merely to prevent liquid from dripping or otherwise leaving the open or free end of conduit 144 during the intervals intermediate discharges. Resistance valve 148 is conventional in design and manufacture and is, therefore, not described or illustrated herein in greater detail.

In operation, control handle 49 is placed either in the first or second position and air under pressure is introduced into tank 10 through pneumatic line 18, so as to maintain the liquid therein under a constant pressure. If valve member 44 is in its first position, the particular liquid within the reservoir 4 will flow through line 22 to control valve 6 where it will pass through arcuate channel 46 and into conduit 138 from which it is introduced into cylindrical measuring chamber 100 through threaded port 58 in end cap 52. The momentum of the in-rushing fluid causes element 102 to move toward piston 90 where it engages sealing surface 98 of annular seal 96, in which position spherical element 102 is held by the force generated by the pressurized liquid. The liquid will further find its way past spherical element 102 and will flow through axially extending holes 101 in piston 90 so as to fill the cylindrical chamber located between end cap 72 and piston 90. When valve member 44 is moved to its second position, the liquid flows from line 22 into valve 6 where it passes through arcuate channel 46 and into flexible hose 140. Hose 140, of course, empties into swivel fitting 116 which transfers the flowing liquid into tubular rod 88 from which it is discharged into port 92 and against spherical metering element 102. Inasmuch as the liquid is now introduced under pressure from the opposite end of measuring chamber 100, spherical element 102 will be propelled in the opposite direction, that is to say, it will move toward end cap 52, by the momentum of the incoming liquid. As spherical element 102 moves, fluid leaves chamber 100 through port 58 and enters conduit 138 from which it passes into valve 6 and flows through arcuate channel 48 therein, the liquid thereafter entering conduit 144 from which it is discharged in an accurately metered quantity. The volume of the dosage or quantity measured is equal to the amount of liquid lying between the element 102 and annular seal 62 located in chamber 100 plus the amount of fluid which slips past metering element 102 as it travels the length of chamber 100. This latter quantity is dependent on many factors such as the size and weight of metering element 102, the viscosity of the liquid, the pressure, and the like.

Of course, if the pressure within tank 10 is increased a different quantity of liquid will slip by metering element 102. To obtain identical dosages over extended periods of time, it is therefore necessary to maintain a substantially constant pressure in tank 10. Constant pressures are, of course, easy to obtain by a number of conventional devices and methods such as pressure regulators, constant pressure pumps, and the utilization of a constant head.

It has been found that metering element 102 will move freely, encounter minimum resistance, and readily engage the beveled sealing surfaces 64, 98, of seals 62, 96, when it is formed from a material having a specific gravity substantially equal to the specific gravity of the fluid being measured.

When valve member 44 is moved back to its first position liquid will again enter measuring chamber 100 through port 58 in end cap 52, as heretofore described, and will unseat spherical metering elements 102, forcing it toward piston 90. Of course, as metering element 102 advances toward piston 90 liquid will pass out of chamber 100 and into tubular rod 88, swivel fitting 116, and flexible hose 140 to control valve 6 where it is conveyed through arcuate channel 48 and discharged into conduit 144 from which it leaves as an accurately metered quantity. When spherical metering element 102 engages sealing surface 98 of seal 96, the flow of fluid will terminate and measuring unit 8 will be triggered for another shot or dosage, so to speak.

To obtain equal dosages irrespective of the direction in which metering element 102 moves, tubular body 50 should be mounted in a horizontal position so that gravitational forces do not aid the advance of element 102 in one direction and not the other, although it is possible to obtain substantially equal dosages in the vertical position when metering element 102 possesses a specific gravity substantially equal to the specific gravity of the liquid measured. Moreover, it has been found by actual experiment that restriction 146, which is of smaller cross-sectional area than restrictions preceding it, causes dispensing apparatus 2 to deliver equal dosages even when the two fluid conduits interconnecting the valve 6 and ends of measuring chamber 100 are of unequal length or otherwise offer unequal resistances to the flow of fluid through them. In other words, the point at which equal and exact flow is determined, irrespective of the direction in which the metering elements 102 moves or the lengths of the two conduits interconnecting valve 6 and metering chamber 100, is at restriction 146.

It has already been noted that the pressure required to open resistance valve 148 is relatively small, and that valve 148 merely prevents liquid from dripping or otherwise leaving the open or free end of conduit 144 during the intervals intermediate discharges.

The quantity of liquid discharged from measuring unit 8, however, can be varied by turning handle 136 of lead screw 132 which advances or withdraws rod 88, depending on the direction of rotation, which, in turn, changes the position of piston 90 within tubular body 50. This, of course, varies the size of measuring chamber 100 as well as the stroke of spherical metering element 102. In other words, when piston 90 is moved toward end cap 72, the size of measuring chamber 100 is enlarged thereby permitting spherical metering element 102 to force a greater quantity of liquid out through ports 58, 92, of end cap 52 and piston 90, respectively. In this connection, it should be noted that holes 101 establish communication between the cylindrical chambers located on each side of piston 90 so that excessive pressures are not created when piston 90 is advanced.

All parts of dispensing apparatus 2 which come in contact with the particular liquid being metered should, of course, remain chemically stable or inert in the presence of such liquid.

It should be noted that valve member 44 of control valve 6 need not be manually operated but can be actuated automatically, for example, by a timing device or by a flow meter inserted in another fluid line to which conduit 142 could be connected. Moreover, the pressure necessary to operate measuring unit 8 need not necessarily be provided by compressed air within tank 10, but could be supplied by a liquid head. Similarly, an adequate pressure differential could be obtained by applying suction to conduit 144, in which instance tank 10 would have to be vented so that atmospheric air could bear against the surface of the liquid therein and force it through valve 6, measuring unit 8, and various lines, conduits, and hoses interconnecting the same.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. An apparatus for dispensing measured quantities of fluid, said apparatus comprising a tubular body, a first end wall located at one end of the tubular body, a second end wall carried by the body and located in spaced relation to the first end wall whereby a measuring chamber is defined by the tubular body and end walls, the first and second end walls being provided with first and second end ports, respectively, which communicate with the measuring chamber, a metering element carried by the tubular body within the measuring chamber for movement between the first and second end walls and having a specific gravity substantially equal to that of the fluid, the metering element being adapted to block the first port when forced against the first end wall and to block the second port when forced against the second end wall, a source of fluid, means for maintaining the fluid under pressure, a control valve, conduits for establishing communication betwen the control valve and the first port, second port and source of fluid, the control valve being adapted for optionally establishing communication between the source of fluid and the first or second ports whereby fluid is introduced into the measuring chamber from one port thereby forcing the metering element toward the opposite port so as to cause a measured dosage of fluid to flow out of the opposite port before the metering element is forced against the end wall in which such opposite port is located, the metering element further being loosely fitted within the measuring chamber so that a limited amount of fluid slips past the metering element as it moves from one end wall to the other.

2. A dispensing apparatus according to claim 1 in which the end walls carry valve seats located in surrounding relation to the ports, the metering element being adapted to engage each valve seat and seal the port which it surrounds so as to prevent fluid from leaving the measuring chamber through such port.

3. A dispensing apparatus according to claim 2 in which the measuring chamber is cylindrical.

4. A dispensing apparatus according to claim 3 in which the metering element is spherical.

5. A dispensing apparatus according to claim 4 in which the control valve is provided with first, second, third, and fourth valve ports, said apparatus being further characterized by a first conduit interconnecting the first valve port and source of pressurized fluid, a second conduit interconnecting the second valve port and the first end port, a third conduit interconnecting the third valve port and the second end port, the control valve having means adapted to move from a first position wherein the first and second valve ports and third and fourth valve ports are in communication, and a second position wherein the first and third valve ports and its second and fourth valve ports are in communication so that fluid will flow through the valve into the measuring chamber and back through the valve for the period of time it takes the metering element to move from one end wall to the other, whereby the fluid is discharged from the fourth valve port in a measured dosage.

6. A dispensing apparatus according to claim 4 in which the control valve is provided with first, second, third, and fourth valve ports, said apparatus being further characterized by a first conduit interconnecting the first valve port and source of pressurized fluid, a second conduit interconnecting the second valve port and the first end port, a third conduit interconnecting the third valve port and the second end port, the control valve being adapted for optionally establishing communication between the first and second valve ports and the third and fourth valve ports wherein fluid will enter the measuring chamber through the first end port and leave through the second end port or between the first and third valve ports and the second and fourth valve ports whereby fluid will enter the measuring chamber through the second end port and will leave through the first end port.

7. A dispensing apparatus according to claim 2 and further characterized by means for altering the volume of the measuring chamber.

8. A dispensing apparatus according to claim 2 in which the second end wall is slidably carried within the tubular body, said apparatus further comprising means for altering the spaced relation between the first and second end walls whereby the volume of the measuring chamber is variable.

9. A dispensing unit according to claim 8 in which the means for altering the spaced relation between the first and second walls comprises a guide carried by the tubular body, a tubular rod slidably mounted within the guide and secured to the second end wall, the tubular rod being in communication with the second end port, and means for axially advancing or retracting the tubular rod.

10. A dispensing apparatus according to claim 9 in which the means for advancing and retracting the tubular rod is a lead screw pivotally fastened at one end to the tubular rod.

References Cited

UNITED STATES PATENTS

| | | | |
|---|---|---|---|
| 384,766 | 6/1888 | Kendall | 222—249 |
| 1,144,583 | 6/1915 | Brown | 222—249 |
| 2,352,490 | 6/1944 | Meyers | 222—250 |
| 2,705,094 | 3/1955 | Howell | 222—335 |
| 3,245,585 | 4/1966 | Dawson | 222—335 X |

ROBERT B. REEVES, *Primary Examiner.*